Sept. 17, 1957  L. RUDMAN  2,806,646
TURBOJET ENGINE WITH RAMJET EFFECT
Filed July 14, 1954
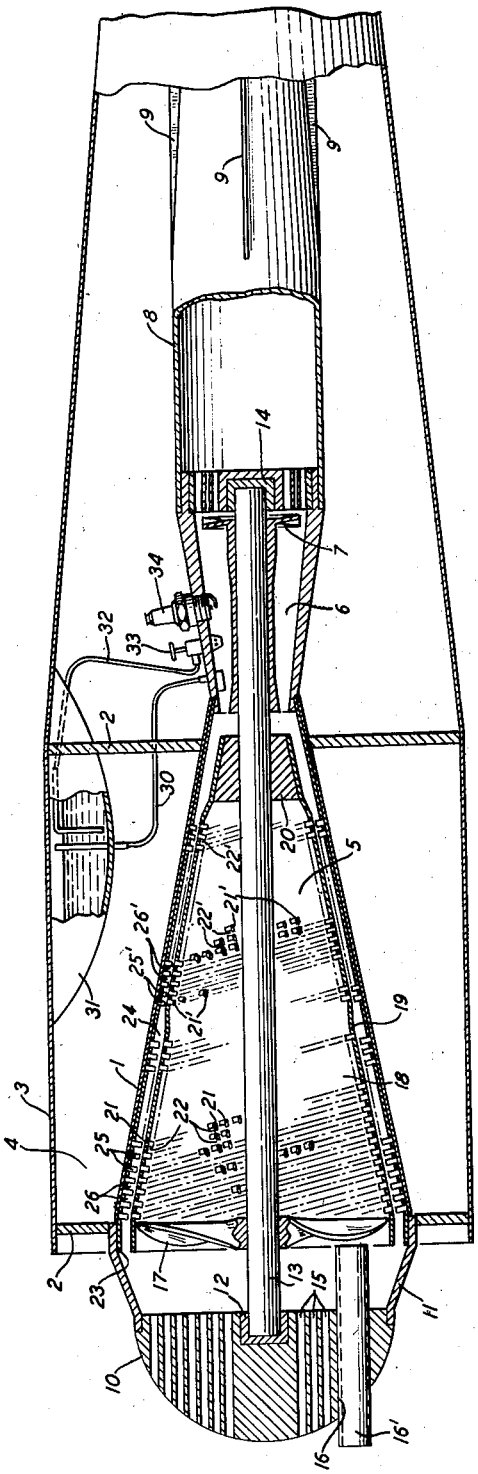
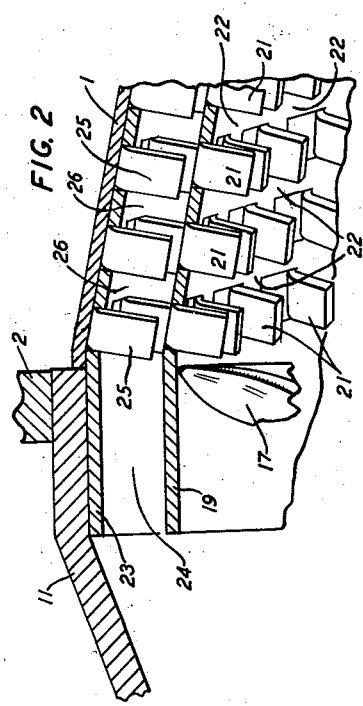
INVENTOR
L. RUDMAN
BY
ATTORNEY United States Patent Office 2,806,646
Patented Sept. 17, 1957

2,806,646

TURBOJET ENGINE WITH RAMJET EFFECT

Louis Rudman, Bronx, N. Y., assignor to Vulcan Jet and Turbine Corporation, New Rochelle, N. Y., a corporation of New York Application July 14, 1954, Serial No. 443,299

8 Claims. (Cl. 230—122)

This invention relates to a turbojet power plant in which means are provided to produce a ramjet effect at the higher speeds so that the power plant operates efficiently at all speeds of the aircraft driven thereby, including both the take-off and the high, even supersonic, speeds.

An object of the invention is to provide a turbojet power plant having a novel construction of its compressor portion in which the intaken air is further compressed in a passage into which the air is inducted on forward movement of the aircraft propelled by the power plant.

A further object of the invention comprises the construction of a turbojet compressor so that air is inducted into the interior of its rotor and is mingled in an annular duct with air inducted directly into such annular duct, the combined air stream being additionally compressed in its passage to the combustion chamber.

Still a further object is to provide a turbojet compressor in which the blades extend from both the stator and the rotor in the direction radially toward the rotor-stator axis and are punched or stamped from the body of each the rotor and the stator, leaving one end of each blade integral with the respective body.

Still a further object of the invention is to provide a rotor for the compressor portion of a turbojet power plant in which the rotor blades do not extend into the duct between the stator and the rotor, the stator blades occupying substantially the width of such duct, thus substantially avoiding vibrations in both the power plant and the aircraft in which it is installed.

Still a further object is to increase the efficiency per unit of weight of the turbojet engine by providing a reduction in the weight of the rotor and stator of my invention as compared to that of the prior art assemblies, in that a minimum of parts are required in the blading of both the rotor and stator as the result of punching the blades directly from the body of the rotor and stator, respectively.

The foregoing, and other, objects, advantages and features of my invention will become more apparent from the following detailed description of an illustrative embodiment of my invention and the accompanying drawing in which:

Figure 1 is a longitudinal and elevational section of the power plant, in simplified form and omitting numerous parts which are well known to stress the essentials of my invention; and Figure 2 is an enlarged segment, as compared to Figure 1, of the upper forward portion of the compressor.

The central housing 1 of the turbojet power plant of my invention is supported by a plurality of radial arms or spiders 2 within, and spaced from, the hollow exterior casing 3, the spacing therebetween forming a duct 4 through which air is inducted to remove radiant heat from the combustion chamber and the tail end walls of the housing. The turbojet power plant per se comprises the compressor 5, the combustion chamber 6, the turbine 7 connected to the rotor of the compressor 5, and the exhaust tail portion 8. Inasmuch as the details of the combustion chamber 6, such as flame holders, fuel supply ducts, nozzles, igniters and the like, as also the construction of the turbine 7, are well known in various forms, such details are not shown in the drawing and are not further described. I provide the exhaust tail portion 8 of the housing with a plurality of longitudinal cooling fins 9, preferably of stream lines cross-section, the fins 9 extending into the exhaust end region of the duct 4 through which fuelless air flows during flight of the aircraft.

The nose or fairing 10 of the turbojet power plant is supported on a spider 11 of which the arms are affixed at their remote ends to the forward external end region of the housing 1 ahead of the most forwardly located spider arms 2. A shaft bearing bore 12 in the fairing 10 rotatably supports the shaft 13 of which the remote end is supported in bearing 14, suitably supported in housing 1, beyond the turbine 7. A plurality of apertures 15 extends axially through the fairing 10 to permit air to be inducted and flow therethrough during flight. For model planes, a larger bore 16 through the fairing 10 is also provided, and is of such diameter that the supply tube 16' from an air pump, or other source of compressed air, may be inserted thereinto for rotation of the fan-shaped forward end member 17 of the rotor which is integrally mounted on the rotatable shaft 13. The larger bore 16 is dispensed with in aircraft carrying their own rotor starting systems, as in the case of commercial and military craft.

The rotor 18 comprises the body portion 19 which is rigidly affixed at its forward end region to and on the outer periphery of the fan-shaped end member 17 and at its rearward end region by the solid annular cylinder 20, both the member 17 and the cylinder 20 being integral with the rotatable shaft 13. The fan-shaped end member 17 has a plurality of blades as shown, up to about six or even more in number, and may be of the air screw or louvre type, with an outer diameter which is substantially larger than that of the solid annular cylinder 20. The rotor body 19 is thus frusto-conical in shape with its larger base forwardly in the direction of air flow. Thus air is induced into the interior of the rotor 18 on rotation, through the spaces between the arms of the spider 11, the fairing apertures 15 and between the blades of the fan 17, and can be emitted from such interior through the interblade apertures in the frusto-conical body 19 of the rotor.

The rotor body 19 has a plurality of blades 21 stamped therefrom so as to leave one end of each blade integral with the rotor body and to leave between each pair of circumferentially successive blades an opening 22. The blades 21 are in the form of a helix longitudinally the rotor body, with the pitch of the helix being preferably constant its entire length. The blades 21 extend at right angles to the pitch angle and inwardly, so that their wide face is at right angles to the helix, and they extend radially towards and longitudinally oblique to the rotatable shaft 13. Sufficient material is left between the successive blades in the circumferential direction as also between successive turns of the helix that the stamped, that is bladed, rotor body 19 is adequately rigid. As is quite usual in compressors, I provide a multi-stage compressor by providing smaller blades 21' from about the midregion lengthwise of the rotor body 19 to the rearward end region thereof, as shown in Figure 1. Blades 21' are punched from the rotor body in the same manner, and with the same orientation and pitch angle, as are blades 21, and have similar, but smaller, openings 22' between each circumferentially successive pair.

The stator 23, positioned about the rotor body 19, is spaced therefrom radially a distance somewhat greater than the radial length of the blades 21 and 21' to form an annular duct 24 open at its forward end and leading to the combustion chamber 6. The stator 23 is also frusto-conical in shape with its conical surface parallel to that of the rotor, so that for each compression stage the duct is of a constant radial width. The stator 23 likewise has punched therefrom a longitudinal helical array of blades 25 and 25' respectively with one end of each blade remaining integral with the body of the stator and provided with an opening, 26 and 26' respectively, between each pair of circumferentially successive blades. The pitch of the helical array of stator blades, 25 and 25', is preferably the same, or substantially the same, as that of the helical array of the rotor blades 21 and 21' so that the helix turns make the same angle with the shaft 13 as do those of the rotor. The blades 25 and 25' are similarly directed radially inwardly as are the blades 21 and 21' of the rotor, are substantially of the same size and orientations respectively as the rotor blades, and hence each blade of a pair of juxtaposed rotor and stator blades is radially aligned with the other blade of the pair. The stator 23 is a close drive fit into the interior of housing 1 which seals the openings 26 and 26' and thus compels any air inducted at the forward and open end of the duct 24, or ejected thereinto through the rotor 19, to flow with increasing compression rearwardly into the combustion chamber 6.

Assuming that the rotation of the shaft 13, and hence of the rotor 18 and the turbine 7, has been initiated in the proper direction by starting means of any well known type not shown, air will be inducted into the interior of the rotor and be caught up by the blades 21 and 21' to be expelled, radially and at the given angle to the shaft 13 of the blades, through the rotor openings 22 and 22'. Because of the angularity at which it is so expelled, the ejected air, now in the duct 24, will have a component rearwardly and will react with the stator blades 25 and 25' to be compressed and directed rearwardly due to the angle which the stator blades make relative to the shaft 13, the impelling force being in the same direction since the rotor blades 21, 21' and the stator blades 25, 25', are parallel to each other. Hence the air ejected into the duct 24 from the rotor will have a helical path predominatingly rearward the combustion chamber. On the injection of fuel into the combustion chamber in proper manner and amount, the turbulent mixture thereof with such air will be ignited and thus drive the turbine 7. As the turbine gathers speed the velocity of the inducted air will be increased augmenting the thrust forces rearward, and the aircraft will move, if permitted to do so, and will ultimately attain sufficient speed for take-off and be airborne. With the aircraft moving and gathering speed, more and more air will be inducted into the forward end of the duct 24, and the inducted air will be compacted successively against the stator blades, 25 and 25', to build up pressure and be mingled with the air injected into the duct by the rotor. A greater quantity of air, and of increased turbulence, will thus flow rearwardly into the combustion chamber, thus adding a ramjet effect to the turbojet power plant. The higher the speed, the greater will be such ram jet effect, up to a certain maximum. So also the amount of air inducted into the duct 4 will increase, thus increasing the heat transfer effect on radiation from the combustion chamber 6 and the tail piece region 8 of the power plant, which likewise results in greater efficiency of the power plant. Furthermore, since the rotor blades 21 and 21' are integral components of the rotor body 19, they do not require any special fastening means and thus the danger of building up any destructive harmonics is substantially eliminated. So also the non-requirement of fastening means for the blades of not only the rotor but also for those of the stator eliminates considerable weight, likewise resulting in greater efficiency of the power plant from the weight viewpoint.

In Figure 1 I have shown some auxiliary equipment required for starting model aircraft which is not required for aircraft carrying their own starting mechanisms. A pipe 30 connects the interior of the combustion chamber 6 to the upper region of the fuel tank 31, and a fuel pipe 32 connects the lower region of the fuel tank to the combustion chamber 33 by way of a valve 33 which may be manually closed and opened. Thus to start a model aircraft, the tank is filled with fuel and closed, and the valve 33 being closed, a source of compressed air is connected to the bore 16 in the fairing 10, as above stated. While some of the compressed or pumped air does escape even though the outlet 16' of the air source is pushed through the bore 16 to be as close as practical to the fan 17, pressure is gradually built up within the combustion chamber 6, and by way of pipe 30 in the fuel tank 31, at the same time as the rotor 18 is caused to rotate by the applied stream of pumped or compressed air. When sufficient pressure has been built up within the tank 31 to assure the desired continuous flow of fuel to the combustion chamber, the spark plug 34 being energized, the valve 33 is opened to the required degree thus initiating combustion in the chamber 6 which now will drive the rotor. Whereupon the tube 16' of the source of air, pump or compressed air tank, is removed from the bore 16, and the model craft may be flown. It will obviously fly until its fuel is used up, and on completion of a flight, the valve 33 is preferably immediately closed, thus readying the model aircraft for its next start and assuring that there will be no loss of fuel on applying the source of air, as above stated, for the next start because of an open fuel valve 33.

It is to be expressly understood that the embodiment of my invention above described is by way of illustration only and is not by way of limitation in any respect, and that various changes therein will readily suggest themselves to the skilled workers in the art without departing from the spirit and scope of my invention.

What I claim is:

1. In a turbojet power plant for aircraft the improvement in the compressor thereof comprising a frusto-conical hollow rotor, a frusto-conical stator positioned about the rotor and radially spaced therefrom, a rotatable shaft coaxial with the rotor an air intake member rigidly on the shaft and having a plurality of radial blades of equal length a solid end member spaced from the air intake member rigidly on the shaft, the rotor being integrally affixed at its larger base to the non-shaft ends of the radial blades of the air intake member and at its smaller base to the periphery of the solid member, an aligned array of blades on the rotor of which each is integral at one end with the rotor and extends obliquely toward the shaft and is provided with an adjacent aperture through the rotor an aligned array of blades of which each is integral at one end with the stator and extends obliquely toward the shaft and is provided with an adjacent aperture through the stator, and a frusto-conical sheath fitted over the external frusto-conical surface of the stator.

2. The improvement in the compressor according to claim 1 in which each aligned array of blades is circumferentially disposed in a helix.

3. The improvement in the compressor according to claim 1 in which each aligned array of blades is disposed in a helix, and the surface of each blade of each array is perpendicular to the conical surface of the rotor and stator.

4. The improvement in the compressor according to claim 1 in which the sheath and the stator as one wall and the rotor as the other wall form an annular duct open at its forward end, the stator blades extend into the duct with their widest faces at an angle to the longitudinal axis of the duct to deflect and compress the air inducted into the open duct end and the air injected into the duct through the apertures in the rotor rearwardly along the duct, and the duct has an open compressed air outlet at its rearward end.

5. The improvement in the compressor according to claim 1 for a multistage compressor in which the blades of the stator and rotor from the forward end to an intermediate region thereof are larger than the blades of the stator and rotor from the intermediate region to the rearward end thereof.

6. The improvement in the compressor according to claim 1 in which the sheath and the stator as one wall and the rotor as the other wall form an annular duct, and the radial distance between the rotor and stator is such that the duct is but slightly wider than the length of the stator blades extending thereinto.

7. In a turbojet power plant, particularly for aircraft, the improvement in the compressor thereof comprising a hollow rotor, a stator positioned about the rotor and radially spaced therefrom, a rotatable shaft coaxial with the rotor and stator, a forward end member and a rearward end member integral with the shaft supporting the rotor in spaced relation on the shaft, a plurality of air intake openings extending through the forward member into the interior of the rotor, a plurality of blades of which each blade has one end integral with the rotor circumferentially spaced about the rotor in a helix with an aperture through the rotor between each successive pair of blades, each blade extending obliquely inward from the rotor with its broader surface substantially normal to the angle of the helix, a plurality of blades of which each blade has one end integral with the stator spaced circumferentially about the stator in a helix and is adjacent to an aperture through the stator, the central angles subtended by the spacing between successive rotor blades and by successive stator blades being equal, each stator blade extending obliquely toward the shaft with its broader surface substantially normal to the stator helix, a sheath fitted over the external stator surface to seal the stator apertures, the stator and sheath forming one wall of an annular duct with the rotor open at the forward end and adapted to induct air into the duct and compress it progressively together with the air ejected into the duct from the interior of the rotor through the rotor apertures and cause it to flow rearwardly in the duct, and an outlet from the duct at its rearward end.

8. The improvement in the compressor according to claim 7 in which the radial spacing between the rotor and stator is slightly in excess of the length of the stator blades extending into the duct.

References Cited in the file of this patent

UNITED STATES PATENTS

| | | |
|---|---|---|
| 2,326,072 | Seippel | Aug. 3, 1943 |
| 2,411,552 | New | Nov. 26, 1946 |
| 2,689,681 | Sabatiuk | Sept. 21, 1954 |